United States Patent Office 3,825,519
Patented July 23, 1974

3,825,519
MOLDING COMPOSITION CONTAINING POLYETHYLENE AND CEMENT
Naohiro Murayama and Makoto Fukuda, Iwaki, Japan, assignors to Kureha Kagaku Kogyo Kabushiki Kaisha, Tokyo, Japan
No Drawing. Filed Aug. 11, 1972, Ser. No. 279,838
Claims priority, application Japan, Aug. 12, 1971, 46/60,635
Int. Cl. C08f 45/04
U.S. Cl. 260—42.13       8 Claims

ABSTRACT OF THE DISCLOSURE

A molding composition containing polyethylene and a cement selected from the group: portland cements, alumina cements, magnesia cements, and silica cements. Preparation is by adding the cement to a polyethylene melt and kneading or by mixing the cement with a polyethylene powder and kneading at a temperature above the melting point of the polyethylene.

BACKGROUND OF THE INVENTION

This invention relates to a molding composition containing polyethylene and cement as its main components.

In the production of molding compositions containing plastics, it is common practice to add inorganic fillers to the plastic to improve the properties of the molding composition. For example, the following molding compositions are disclosed in the prior art: phenolic resin and wood meal, urea resin and pulp, gum and a carbon black, polyester and a glass fiber, and epoxy resin and a carbon fiber.

Recently, molding compositions composed of a mixture of a high density polyethylene and gypsum, calcium sulfite ($CaSO_3$), or calcium carbonate have been proposed as industrial molding materials; however, it has been found that such molding compositions lack the requisite mechanical strength.

SUMMARY OF THE INVENTION

It has now been discovered that when polyethylene is mixed with a cement such as commercially available portland cement, an alumina cement, a magnesia cement or a silica cement, the mixture is a composite molding material having a high modulus of elasticity and improved tensile strength. Even if the amount of the cement used is a great as 90% by weight of the composition, there does not occur any reduction in tensile strength or bending strength of the products made from the molding composition. The compositions of the present invention are prepared by adding the cement to a polyethylene melt and kneading or by mixing the cement with a polyethylene powder and kneading at a temperature above the melting point of the polyethylene.

Polyethylene, one of the most widely used plastics, is water-repellent, easily combustible, soft and lightweight. When a molding material containing the polyethylene is used as a construction material, it generally retains the characteristics mentioned above. According to the present invention, however, polyethylene when mixed with cement, is improved in its water-repellence and incombustibility and is harder. The costs of the molding compositions of the present invention are far lower than that of polyethylene alone. These molding compositions find a wide variety of applications as construction materials.

The molding composition of the present invention can be prepared by melting commercially available polyethylene by use of heating rolls heated to a temperature higher than the melting point of the polyethylene, or to a temperature of 140–180° C., and then mixing a cement with the melted polyethylene and kneading the mixture. Alternatively, polyethylene powder may be mixed with the cement and kneaded at a temperature higher than the melting point of the polyethylene.

In order to form a mold from a molding composition of the present invention, the kneaded material is subjected to a hot molding process at a temperature above 140° C., e.g. 180° C. When the molded material is stretched or oriented at a temperature within a range of from room temperature to about 130° C., the result is a porous material. The porous portions of the material can be utilized as a construction material. If desired, a dye or other material may be applied to the porous portions.

The polyethylene used in the present invention may be any one of the commercially available polyethylenes. However, the preferred polyethylene is a high density polyethylene which has a relatively high-molecular-weight, or a melt index of less than 1.0. Where the molecular weight or melt viscosity of the polyethylene used is very high, the molding composition can be prepared at temperatures higher than 200° C. Even if the composition is prepared at such a high temperature, the cement does not decompose; therefore, no problem is created by the preparation of molding compositions at such high temperatures.

Suitable polyethylenes that may be used in the present invention also include copolymers having ethylene as a main component, which are obtained by co-polymerizing more than 60 mole percent of ethylene and less than 40 mole percent of another monomer which is copolymerizable with the ethylene.

The cements suitable for use in the present invention include commercially available cements such as portland cement, alumina cement, magnesia cement or silica cement. The physical properties of these cements remain unchanged when combined with the polyethylene in accordance with this invention. Conventional molding techniques, generally used in the polyethylene molding industry, may be used in conjunction with the molding compositions of the present invention. In order to improve the processability of the composition of the present invention in the molding process, a high-molecular-weight elastomer such as polybutadiene, a polyisobutylene, an ethylenevinyl acetate copolymer, a polyvinyl ester, etc. may be added to the molding composition of the present invention in a ratio of less than 10 parts by weight of the elastomer to 100 parts of the composition. By the addition of such a high-molecular-weight elastomer to the molding composition, the flow characteristics of the melted composition and the physical properties of the mold obtained from the composition may be improved.

In order that the molding composition can act as a thermoplastic material, the composition should include at least 10% by weight and not more than 50% by weight polyethylene. When cement is incorporated into the molding composition in an amount of more than 90% by weight, the molding composition loses its thermoplastic properties. On the other hand, when polyethylene is used in an amount of more than 50% by weight, properties particular to the cement cannot be recognized in the composition and the physical properties of the mold obtained from this composition are less desirable, approaching those of the conventional polyethylene-containing molding compositions containing gypsum, calcium carbonate or the like.

The following examples are intended to be illustrative only, and are not intended to limit the scope of the present invention as defined by the appended claims.

EXAMPLE 1

40% by weight of a commercially available polyethylene powder (obtained by a low pressure polymerization process, and having a melt index of 0.3 was mixed with 60% by weight of a portland cement powder. The mixture was kneaded for 10 min. by means of hot rolls having a surface temperature of from 150 to 160° C. to produce a molding composition. A sheet having a thickness of about 0.5 mm. was formed from the molding composition. The sheet was cut into small pieces of suitable size, and the pieces were superimposed to form a 1 mm. thick plate by application of 0.2 kg./cm.$^2$ for 5 min. by means of a press machine heated to 180° C. That plate was then tested to determine tensile strength and bending strength. The tensile strength was measured in accordance with JIS–K 6723 (1969) (JIS: Japanese Industrial Standard). The test results are shown in Table 1 below.

TABLE 1

| Sample | Tensile strength, kg./mm. | Modulus of elasticity, kg./mm.$^2$ | Crack when bent at 180° |
|---|---|---|---|
| Polyethylene | 21.8 | 40 | No. |
| Polyethylene/portland cement 40/60 (of example 1) | 1.42 | 76 | No. |

NOTE.—The tensile strength was measured by means of s "Tensilon" produced by Toyo Seiki K.K. at a temperature of 25° °C. in a relative humidity of 50%. The bending test was conducted at 25° C.

EXAMPLE 2

20% by weight of a commercially available powdered polyethylene (obtained by a low pressure polymerization process, with a melt index of 0.3) and 80% by weight of a commercially available powdered portland cement were mixed together and the mixture kneaded by means of hot rolls having a surface temperature of from 150 to 160° C. for 10 min. The sheet was cut into pieces of suitable size which were in turn superimposed to form a 1 mm. thick pressed plate by means of a press machine heated to 180° C. under a pressure of 0.2 kg./cm.$^2$ for 5 min. The pressed plate was tested for tensile strength using the "Tensilon" apparatus produced by Toyo Seiki K.K., following the procedure of JIS–K 6723 (1969). For purposes of comparison a prior art composition, a calcium carbonate filled polyethylene, was tested under identical conditions. The test results are given in Table 2, below.

TABLE 2

| Sample | Tensile strength, kg./mm.$^2$ | Modulus of elasticity, kg./mm.$^2$ | Crack when bent at 180° |
|---|---|---|---|
| Polyethylene/portland cement 20/80 (of example 2) | 0.92 | 87.7 | Very slight cracking. |
| Polyethylene/calcium carbonate 20/80 | 0.74 | 72.0 | Yes. |

NOTE.—The above tests were conducted at a temperature of 25° C. and relative humidity of 50%.

EXAMPLE 3

40% by weight of commercially available polyethylene (manufactured by a high pressure polymerization process and having a melt index of 20) was melted by means of hot rolls heated to 140° C. (surface temperature) and then a commercially available portland cement was added to the melted polyethylene. After the addition of the cement, the mixture was kneaded for 10 min. to produce a molding composition. Sheets, each having a thickness of 0.5 mm., were formed from the molding composition. The sheets were then superimposed and pressed under 0.2 kg./cm.$^2$ for 5 min. on a press machine heated to 180° C. to form a 1 mm. thick plate. The plate was then tested to determine tensile strength and bending strength. The tensile strength was measured using the "Tensilon" apparatus produced by Toyo Seiki K.K. in accordance with the procedure of JIS–K 6723 (1969). For comparative purposes, the unfilled polyethylene was subjected to the same tests. The test results are given in Table 3, below.

TABLE 3

| Sample | Tensile strength, kg./mm.$^2$ | Modulus of elasticity, kg./mm.$^2$ | Crack when bent at 180° |
|---|---|---|---|
| Polyethylene | 1.20 | 20 | No. |
| Polyethylene/portland cement 40/60 | 1.07 | 30 | Yes. |

NOTE.—The above tests were conducted at 25° C. and 50% relative humidity.

EXAMPLE 4

40% by weight of a commercially available polyethylene (manufactured by a low pressure polymerization process and having a melt index of 0.3) and 60% by weight of a commercially available alumina cement, each in the form of powder, were mixed and the mixture kneaded on hot rolls having surface temperature of from 150 to 160° C. for 10 min. A sheet about 0.5 mm. thick was prepared from same. The sheet was cut into pieces of suitable size which were in turn superimposed and pressed to form a 1 mm. thick plate by means of a press machine heated to 180° C. under a pressure of 0.2 kg./cm.$^2$ for 5 min. The resultant pressed plate was subjected to tensile and bending tests. The tensile strength was measured by the "Tensilon" produced by Toyo Seiki K.K. in accordance with JIS–K 6723 (1969). The test results are given in Table 4, below.

TABLE 4

| Sample | Tensile strength, kg./mm.$^2$ | Modulus of elasticity, kg./mm.$^2$ | Crack when bent at 180° |
|---|---|---|---|
| Polyethylene/alumina cement 40/60 | 1.40 | 60.0 | No. |

NOTE.—The above tests were conducted at 25° C. and 50% relative humidity.

EXAMPLE 5

In order to test the mechanical strength of the prior art polyethylene-containing molding compositions, experiments were conducted wherein molded sheets (0.5 mm. thick) were obtained from various molding compositions, each composed of a mixture of 20–40% by weight of commercially available polyethylene and 60–80% by weight of one of the following: α-crystalline gypsum, α- or β-semi-crystalline gypsum and calcined gypsum (which is obtained by calcining crystalline gypsum at a temperature of 180–200° C.) which have differing contents of crystallization water. The molded sheets were then superimposed and pressed to form a plate (1 mm. thick) under elevated temperature and pressure conditions. The pressed plate was then subjected to various strength tests. In these tests, it was noted that when the pressed plates were bent to an angle of 180°, at a normal temperature (25–30° C.), cracks appeared in the pressed plate.

Bending tests were also conducted using pressed plates which were prepared in the same manner as described above from molding compositions composed of a mixture of 20–40% by weight of commercially available high pressure process polyethylene or high density polyethylene and 60–80% by weight of commercially available calcium carbonate. These pressed plates were easily cracked and were brittle regardless of the amount of the calcium carbonate. Pressed mold plates prepared from a molding composition composed of 60% by weight of polyethylene and 40% by weight of calcium carbonate were also subjected to measurements of tensile strength and modulus of elasticity. The tensile strength measured was less than 70% of that of a pressed mold plate made of polyethylene alone. With a pressed mold plate made of a molding composition composed of 80% by weight of polyethylene and 20% by weight of calcium carbonate, the tensile strength of the pressed mold plate was as low as about 30% of that of polyethylene alone.

What is claimed is:

1. A stretchable thermoplastic molding composition consisting essentially of a mixture of 10–50% by weight of a polyethylene or a copolymer containing at least 60 mole percent ethylene and 50–90% by weight of a cement, selected from portland cements, alumina cements, magnesia cements, and silica cements.

2. The molding composition of claim 1 wherein said polyethylene is a polyethylene selected from the group consisting of high pressure polymerization process polyethylenes, high density polyethylenes and low pressure polymerization process polyethylenes.

3. The molding composition of claim 1 wherein said ethylene copolymer is a copolymer containing ethylene in an amount more than 60 mole percent.

4. The molding composition of claim 1 wherein said composition is capable of being stretched at a temperature within a range of from room temperature to about 130° C. to form a porous sheet.

5. The molding composition of claim 1 further consisting essentially of 10 parts by weight or less of a high-molecular-weight elastomer per 100 parts by weight of said composition.

6. The molding composition of claim 5 wherein said high-molecular-weight elastomer is selected from the group consisting of polybutadienes, polyisoprenes, ethylene-vinyl acetate copolymers and polyvinyl esters.

7. A process for the production of a stretchable thermoplastic molding composition consisting essentially of the steps of mixing 10–50% by weight of a polyethylene or an ethylene copolymer containing at least 60 mole percent ethylene and 50–90% by weight of a cement selected from portland cements, alumina cements, magnesia cements and silica cements to form a mixture and kneading said mixture at a temperature of from 140 to 180° C.

8. A process for the production of a stretchable thermoplastic molding composition consisting essentially of the steps of mixing 10–50% by weight of a polyethylene or an ethylene copolymer containing at least 60 mole percent ethylene with 50–90% by weight of a cement selected from portland cements, alumina cements, magnesia cements and silica cements to form a mixture, adding 10 parts by weight or less of a high-molecular-weight elastomer per 100 parts by weight of said mixture, and kneading the resultant mixture at a temperature of from 140 to 180° C.

References Cited

UNITED STATES PATENTS

| | | | |
|---|---|---|---|
| 2,757,168 | 7/1956 | Himsworth | 260—41 A |
| 3,360,493 | 12/1967 | Evans | 260—29.6 S |
| 3,563,939 | 2/1971 | Stevens | 260—41 B |
| 3,285,873 | 11/1966 | Bailey | 260— 41 A |
| 3,591,395 | 7/1971 | Zonsveld | 260—29.6 S |

OTHER REFERENCES

S. Goldfein: "Fibrous Reinforcement for Portland Cement" in Modern Plastics, April 1965, pp. 156, 158, 160.

MORRIS LIEBMAN, Primary Examiner

P. R. MICHL, Assistant Examiner

PO-1050
(5/69)

UNITED STATES PATENT OFFICE
CERTIFICATE OF CORRECTION

Patent No. 3,825,519　　　　　　　Dated July 23, 1974

Inventor(s) Naohiro Murayama et al

It is certified that error appears in the above-identified patent and that said Letters Patent are hereby corrected as shown below:

In the Specification:

Column 1, line 47, "is a great" should read --is as great--.

Column 3, in Table 1, "21.8" should read --2.18--; "of s 'Tensilon'" should read --of a "Tensilon"--; "25°°C" should read --25°C--.

Signed and sealed this 8th day of October 1974.

(SEAL)
Attest:

McCOY M. GIBSON JR.　　　　　　C. MARSHALL DANN
Attesting Officer　　　　　　　　Commissioner of Patents